United States Patent
Lai et al.

(10) Patent No.: US 12,158,841 B2
(45) Date of Patent: Dec. 3, 2024

(54) CONTROL METHOD OF FLASH MEMORY CONTROLLER AND ASSOCIATED FLASH MEMORY CONTROLLER AND STORAGE DEVICE

(71) Applicant: Silicon Motion, Inc., Hsinchu County (TW)

(72) Inventors: Kun-Cheng Lai, Hsinchu County (TW); Yen-Yu Jou, Taoyuan (TW)

(73) Assignee: Silicon Motion, Inc., Hsinchu County (TW)

( * ) Notice: Subject to any disclaimer, the term of this patent is extended or adjusted under 35 U.S.C. 154(b) by 3 days.

(21) Appl. No.: 18/123,333

(22) Filed: Mar. 20, 2023

(65) Prior Publication Data

US 2024/0320142 A1 Sep. 26, 2024

(51) Int. Cl.
*G06F 12/00* (2006.01)
*G06F 12/02* (2006.01)

(52) U.S. Cl.
CPC .. *G06F 12/0246* (2013.01); *G06F 2212/1016* (2013.01)

(58) Field of Classification Search
CPC .............. G06F 12/0246; G06F 2212/1016
See application file for complete search history.

(56) References Cited

U.S. PATENT DOCUMENTS

| 11,586,385 | B1* | 2/2023 | Lercari | G06F 1/30 |
|---|---|---|---|---|
| 2022/0188020 | A1* | 6/2022 | Ishiguro | G06F 3/064 |
| 2022/0214808 | A1* | 7/2022 | Lin | G06F 12/0246 |
| 2022/0269434 | A1* | 8/2022 | Shin | G06F 3/0631 |
| 2022/0269440 | A1* | 8/2022 | Lin | G06F 3/0604 |
| 2022/0317878 | A1* | 10/2022 | Lin | G06F 3/0644 |
| 2022/0317879 | A1* | 10/2022 | Lin | G06F 3/0656 |
| 2022/0404966 | A1* | 12/2022 | Kanno | G06F 3/0631 |
| 2024/0094903 | A1* | 3/2024 | Kavirayani | G06F 3/0679 |

* cited by examiner

*Primary Examiner* — David Yi
*Assistant Examiner* — Tahilba O Puche
(74) *Attorney, Agent, or Firm* — Winston Hsu

(57) ABSTRACT

The present invention provides a control method of a flash memory controller is disclosed, wherein the flash memory controller is configured to access a flash memory module, and the control method comprising: allocating a memory space within a memory for storing data from the host device; dividing the memory space into a plurality of zone buffers, wherein each of the zone buffers is used to store data corresponding to one zone having an opened state; and for a first zone buffer of the plurality of zone buffers, controlling a first buffer and a second buffer within the first zone buffer to alternately store data of a first zone from the host device and write the data of the first zone to a zoned namespace of the flash memory module.

18 Claims, 14 Drawing Sheets

CONTROL METHOD OF FLASH MEMORY CONTROLLER AND ASSOCIATED FLASH MEMORY CONTROLLER AND STORAGE DEVICE

BACKGROUND OF THE INVENTION

1. Field of the Invention

The present invention relates to a flash memory, and more particularly, to a flash memory controller and an associated control method.

2. Description of the Prior Art

In the Non-Volatile Memory express (NVMe) specification, a zoned namespace is standardized. In a storage system, a host device can assign a plurality of zones, and each zone has one of a plurality of states such as empty state, opened state, closed state, full state, read-only state and off-line state. The opened state means that the corresponding zone is allowed to be written data by the host device, so a storage device such as a solid-state drive (SSD) will allocate a dedicated space in a dynamic random access memory (DRAM) for the zone to use. For example, if the host device indicates that four of the zones have the opened state, the storage device needs to allocate four dedicated spaces in the DRAM.

However, due to the limited capacity of the DRAM, there is an upper limit to a number of the zones having the opened state. Therefore, the host device cannot open too many zones for data writing, resulting in that the performance of the storage device cannot be further increased.

SUMMARY OF THE INVENTION

It is therefore an objective of the present invention to provide a flash memory controller capable of efficiently managing the DRAM and a flash memory module, to solve the above-mentioned problems.

According to one embodiment of the present invention, a control method of a flash memory controller is disclosed, wherein the flash memory controller is configured to access a flash memory module, the flash memory module comprises a plurality of blocks, and the control method comprising: receiving a settling command from a host device, wherein the settling command configures at least one portion of the flash memory module as a zoned namespace, wherein the zoned namespace logically comprises a plurality of zones, the host device performs a zone-based data write operation on the zoned namespace, each zone has a same size, logical addresses corresponding to each zone are continuous, and the logical addresses are not overlapping between zones; allocating a memory space within a memory for storing data from the host device; dividing the memory space into a plurality of zone buffers, wherein each of the zone buffers is used to store data corresponding to one zone having an opened state; and for a first zone buffer of the plurality of zone buffers, controlling a first buffer and a second buffer within the first zone buffer to alternately store data of a first zone from the host device and write the data of the first zone to the zoned namespace of the flash memory module.

According to one embodiment of the present invention, a flash memory controller is disclosed, wherein the flash memory controller is configured to access a flash memory module, the flash memory module comprises a plurality of blocks, and the flash memory controller comprising a read only memory configured to store a code, and a microprocessor configured to execute the code for controlling access of the flash memory module, and a buffer memory. The microprocessor is configured to perform the steps of: receiving a settling command from a host device, wherein the settling command configures at least one portion of the flash memory module as a zoned namespace, wherein the zoned namespace logically comprises a plurality of zones, the host device performs a zone-based data write operation on the zoned namespace, each zone has a same size, logical addresses corresponding to each zone are continuous, and the logical addresses are not overlapping between zones; allocating a memory space within a memory for storing data from the host device; dividing the memory space into a plurality of zone buffers, wherein each of the zone buffers is used to store data corresponding to one zone having an opened state; and for a first zone buffer of the plurality of zone buffers, controlling a first buffer and a second buffer within the first zone buffer to alternately store data of a first zone from the host device and write the data of the first zone to the zoned namespace of the flash memory module.

According to one embodiment of the present invention, a storage device comprising a flash memory module and a flash memory controller is disclosed. The flash memory module comprises a plurality of blocks, and the flash memory controller is configured to access the flash memory module. The flash memory controller is configured to perform the steps of: receiving a settling command from a host device, wherein the settling command configures at least one portion of the flash memory module as a zoned namespace, wherein the zoned namespace logically comprises a plurality of zones, the host device performs a zone-based data write operation on the zoned namespace, each zone has a same size, logical addresses corresponding to each zone are continuous, and the logical addresses are not overlapping between zones; allocating a memory space within a memory for storing data from the host device; dividing the memory space into a plurality of zone buffers, wherein each of the zone buffers is used to store data corresponding to one zone having an opened state; and for a first zone buffer of the plurality of zone buffers, controlling a first buffer and a second buffer within the first zone buffer to alternately store data of a first zone from the host device and write the data of the first zone to the zoned namespace of the flash memory module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
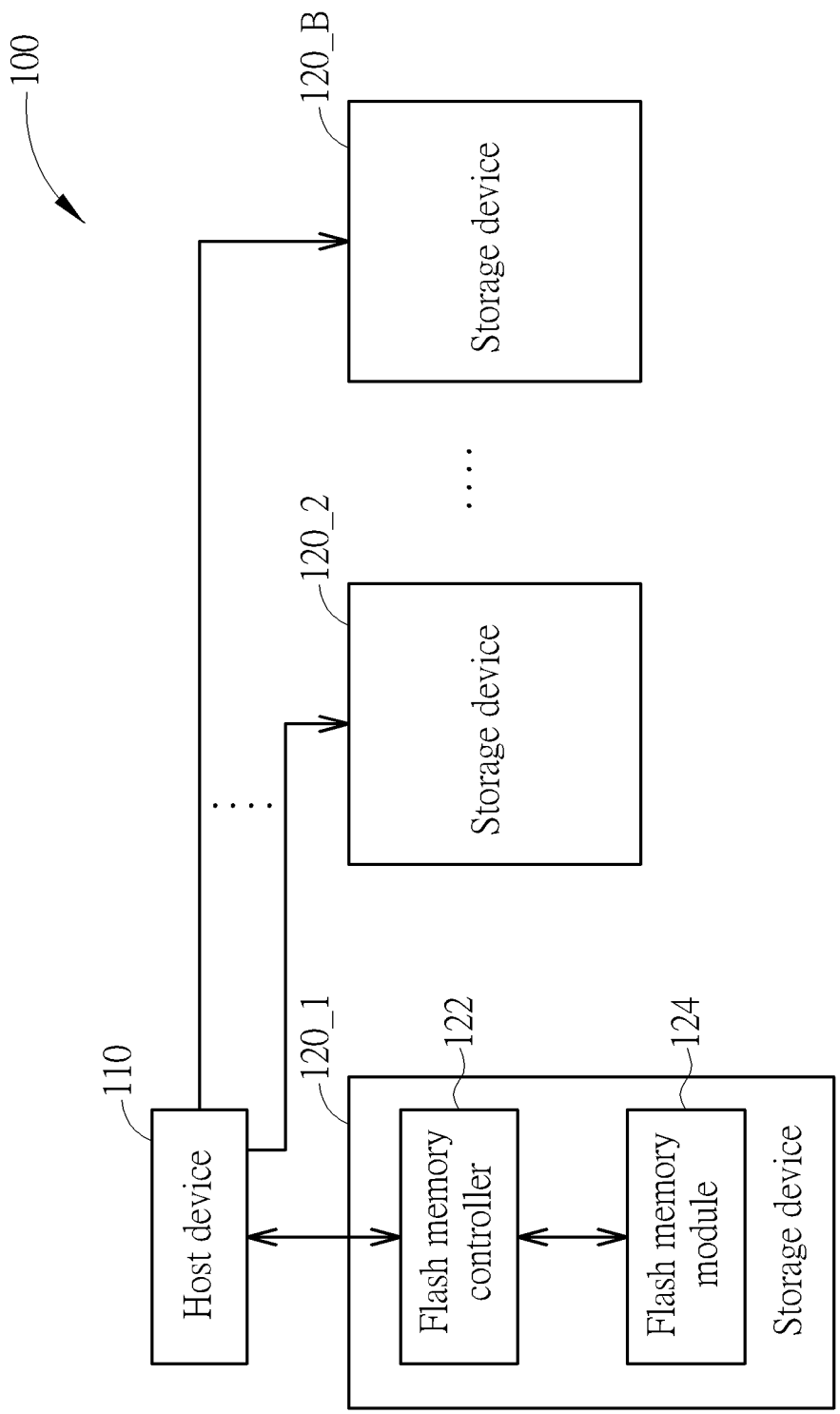
FIG. 1 is a diagram illustrating an electronic device according to an embodiment of the present invention.

FIG. 1 is a diagram illustrating an electronic device 100 according to an embodiment of the present invention. As shown in FIG. 1, the electronic device 100 comprises a host device 110 and a plurality of storage devices 120_1-120_B. Each storage device (e.g., storage device 120_1) includes a flash memory controller 122 and a flash memory module 124. In the present embodiment, each of the plurality of storage devices 120_1-120_B can be a SSD or any storage device having a flash memory module. The host device 110 can be a central processing unit or other electronic devices or components that can be used to access the storage devices 120_1-120_B. The electronic device 100 can be a server, a personal computer, a laptop computer or any portable electronic device. It should be noticed that although a plurality of storage devices 120_1-120_B are shown in FIG. 1, in some embodiments, the electronic device 100 may have a single storage device 120_1.

Figure 2:
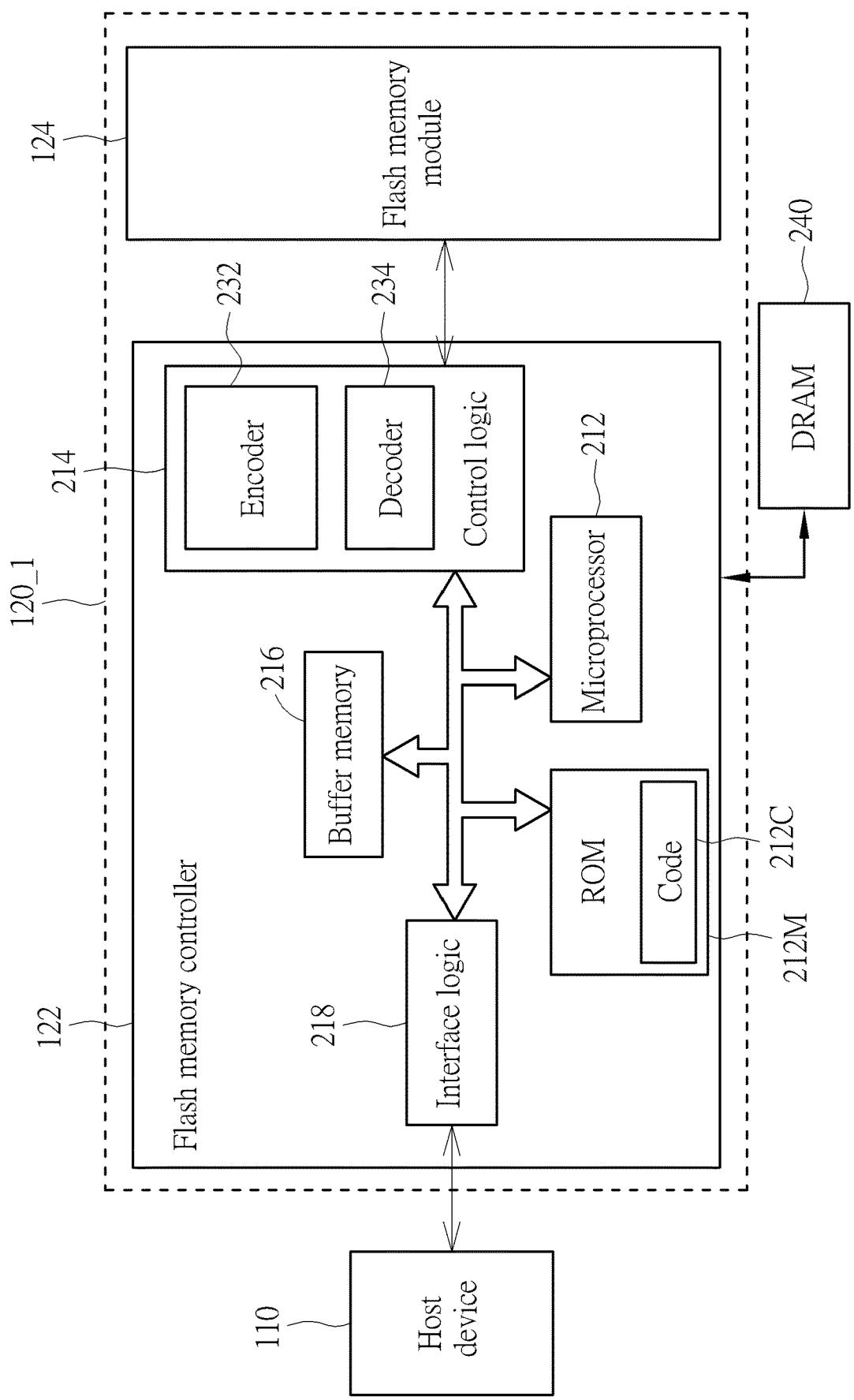
FIG. 2 is a diagram illustrating a flash memory controller in a storage device according to an embodiment of the present invention.

FIG. 2 is a diagram illustrating the storage device 120_1 according to an embodiment of the present invention. As shown in FIG. 2, the flash memory controller 122 comprises a microprocessor 212, a read only memory (ROM) 212M, a control logic 214, a buffer memory 216 and an interface logic 218. The read only memory 212M is configured to store a code 212C, and the microprocessor 212 is configured to execute the code 212C to control access of the flash memory module 124. The control logic 214 includes an encoder 232 and a decoder 234, wherein the encoder 232 is configured to encode data which is written in the flash memory module 124 to generate a corresponding check code (also known as an error correction code (ECC)), and the decoder 234 is configured to decode data read from the flash memory module 124.

In a general situation, the flash memory module 124 includes a plurality of flash memory chips, and each flash memory chip includes a plurality of blocks. The flash memory controller 122 performs a block-based erase operation upon the flash memory module 124. In addition, a block has a specific number of pages, wherein the flash memory controller 122 performs a page-based write operation upon the flash memory module 124. In the present embodiment, the flash memory module 124 is a 3D NAND-type flash memory module.

In practice, through the microprocessor 212 executing the code 212C, the flash memory controller 122 may use its own internal components to perform many control operations. For example, the flash memory controller 122 uses the control logic 214 to control access of the flash memory module 124 (especially access of at least one block or at least one page), uses the buffer memory 216 to perform a required buffering operation, and uses the interface logic 218 to communicate with a host device 110. The buffer memory 216 is implemented by a random access memory (RAM). For example, the buffer memory 216 may be a static RAM (SRAM), but the present invention is not limited thereto. In addition, the flash memory controller 122 is coupled to a dynamic random access memory (DRAM) 240. It should be noticed that a DRAM 240 may also be included in the flash memory controller 122. For example, the DRAM 240 and the flash memory controller 122 may coexist in the same package.

In one embodiment, the storage device 120_1 conforms to the NVme specification. That is, the interface logic 218 conforms to a specific communication specification such as a peripheral component interconnect (PCI) or a specification PCI-Express (PCIe) specification, and performs communication according to the specific communication specification. For example, the interface logic 218 communicates with the host device 110 via a connector.

Figure 3:
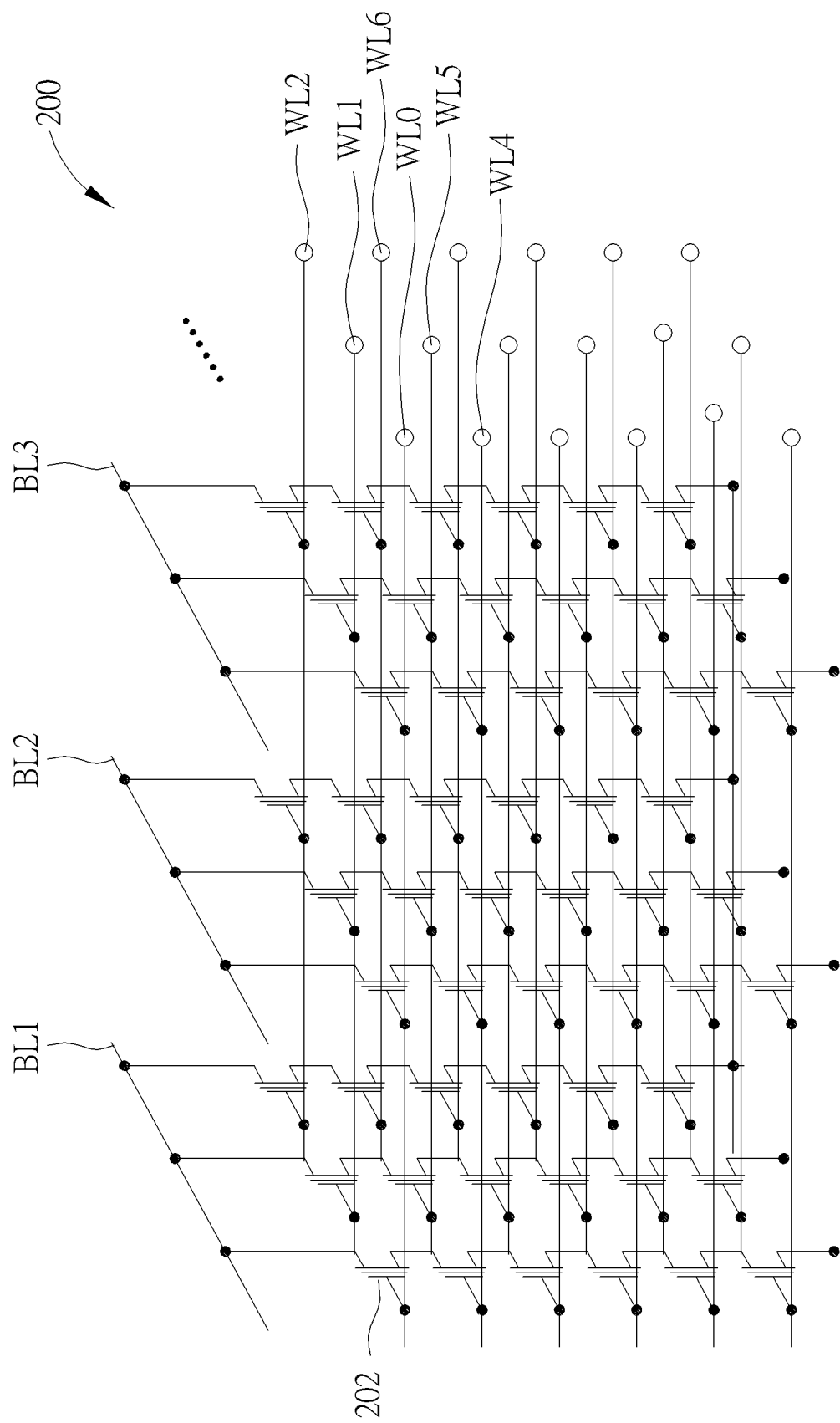
FIG. 3 is a diagram illustrating a block in a flash memory module according to an embodiment of the present invention.

FIG. 3 is a diagram illustrating a block 200 of the flash memory module 124 according to an embodiment of the present invention, wherein the flash memory module 124 is a 3D NAND-type flash memory module. As shown in FIG. 3, the block 200 includes a plurality of memory cells, such as floating gate transistors 202 shown in FIG. 3 or other charge trapping components. A 3D NAND-type flash memory structure is formed through a plurality of bit lines (only BL1-BL3 are shown in FIG. 3) and a plurality of word lines (e.g., WL0-WL2 and WL4-WL6 shown in FIG. 3). Taking a top plane in FIG. 3 as an example, all floating gate transistors on the word line WL0 form at least one page, all floating gate transistors on the word line WL1 form at least another one page, all floating gate transistors on the word line WL2 form at least yet another one page, and so on. In addition, the definition between the word line WL0 and the page (logic page) may vary depending on a writing method of the flash memory. In detail, when data are stored using a single-level cell (SLC) means, all floating gate transistors on the word line WL0 correspond to only one logic page; when data are stored using a multi-level cell (MLC) means, all floating gate transistors on the word line WL0 correspond to two logic pages; when data are stored using a triple-level cell (TLC) means, all floating gate transistors on the word line WL0 correspond to three logic pages; and when data are stored using a quad-level cell (QLC) means, all floating gate transistors on the word line WL0 correspond to four logic pages. The 3D NAND-type flash memory structure and the relationship between word lines and pages are obvious to those skilled in the art. For simplification, no further illustration is provided.

Figure 4:
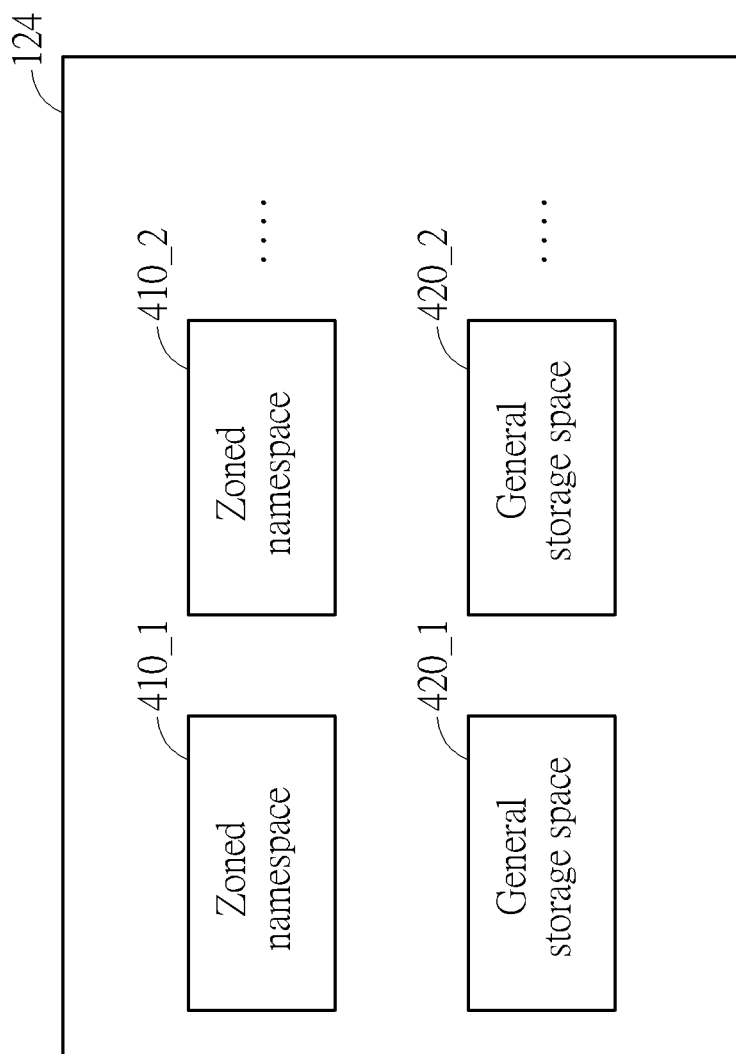
FIG. 4 is a diagram illustrating the flash memory module comprising a general storage space and a zoned namespace.
Figure 5:
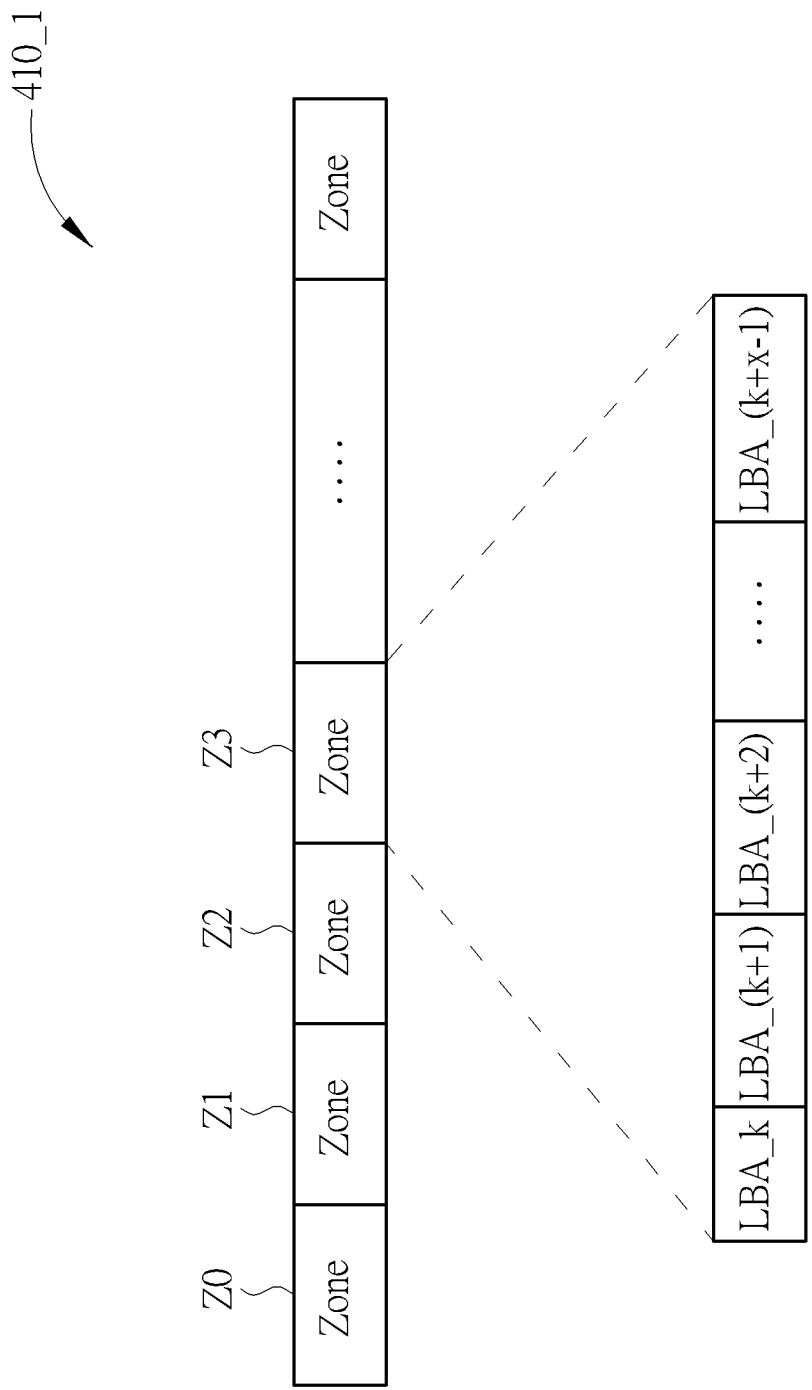
FIG. 5 is a diagram illustrating the zoned namespace divided into multiple zones.

In the present embodiment, the host device 110 can configure at least a part of the flash memory module 124 as a zoned namespace by sending a settling command set, such as a zoned namespace command set. Referring to FIG. 4, the host device 110 can send a settling command set to the flash memory controller 122, such that the flash memory module 124 has at least one zoned namespace (in the present embodiment, taking the zoned namespaces 410_1 and 410_2 as examples) and at least one general storage space (in this embodiment, taking the general storage spaces 420_1 and 420_2 as examples). The zoned namespace 410_1 is divided into multiple zones for access, and the host device 110 must perform a logical block address (LBA)-based data writing operation in the zoned namespace 410_1. A logical block address (or logical address in brief) can represent one 512-byte data or one 4-kilobyte data, and the host device 110 needs to write data with consecutive logical addresses to a zone. Specifically, referring to FIG. 5, the zoned namespace 410_1 is divided into multiple zones (e.g., zones 20, 21, 22, 23, etc.), where the size of the zone is set by the host device 110, but the size of each zone is the same. The logical addresses within each zone must be continuous, and there will be no overlapping logical addresses between the zones, that is, one logical address can only exist in one zone. For example, if the size of each zone is "x" logical addresses, and the starting logical address of the zone Z3 is LBA k, then the zone Z3 is used to store data with the logical addresses LBA k, LBA (k+1), LBA (k+2), LBA (k+3), . . . , LBA (k+x−1). In one embodiment, the logical addresses of adjacent zones are also continuous. For example, the zone Z0 is used to store data with logical addresses LBA_1-LBA_2000, the zone Z1 is used to store data with logical addresses LBA_2001-LBA_4000, the zone Z2 is used to store data with logical addresses LBA_4001-LBA_6000, the zone Z3 is used to store data with logical addresses LBA_6001-LBA_8000, and so on. In addition, the amount of data corresponding to a logical address can be determined by the host device 110. For example, the amount of data corresponding to one logical address can be 4 kilobytes (KB).

In addition, when being written in each zone, the data is written according to the sequence of the logical addresses of the data. In detail, the flash memory controller 122 sets a write point according to the written data to control the writing sequence of the data. In detail, assuming that the zone Z1 is used to store data with logical addresses LBA_2001-LBA_4000, after the host device 110 transmits the data corresponding to the logical addresses LBA_2001-LBA_2051 to the flash memory controller 122, the flash memory controller 122 sets the write point to the next logical address LBA_2052. If the host device 110 subsequently transmits data belonging to the same zone but does not have the logical address LBA_2052, for example, the host device 110 transmits data with the logical address LBA_3000, the flash memory controller 122 rejects the data writing operation and returns the message of writing failure to the host device 110; in other words, only when the logical address of the received data is the same as the logical address pointed to by the write point, the flash memory controller 122 allows the data writing operation. In addition, if data in multiple zones are written alternately, each zone can have its own write point.

Figure 6:
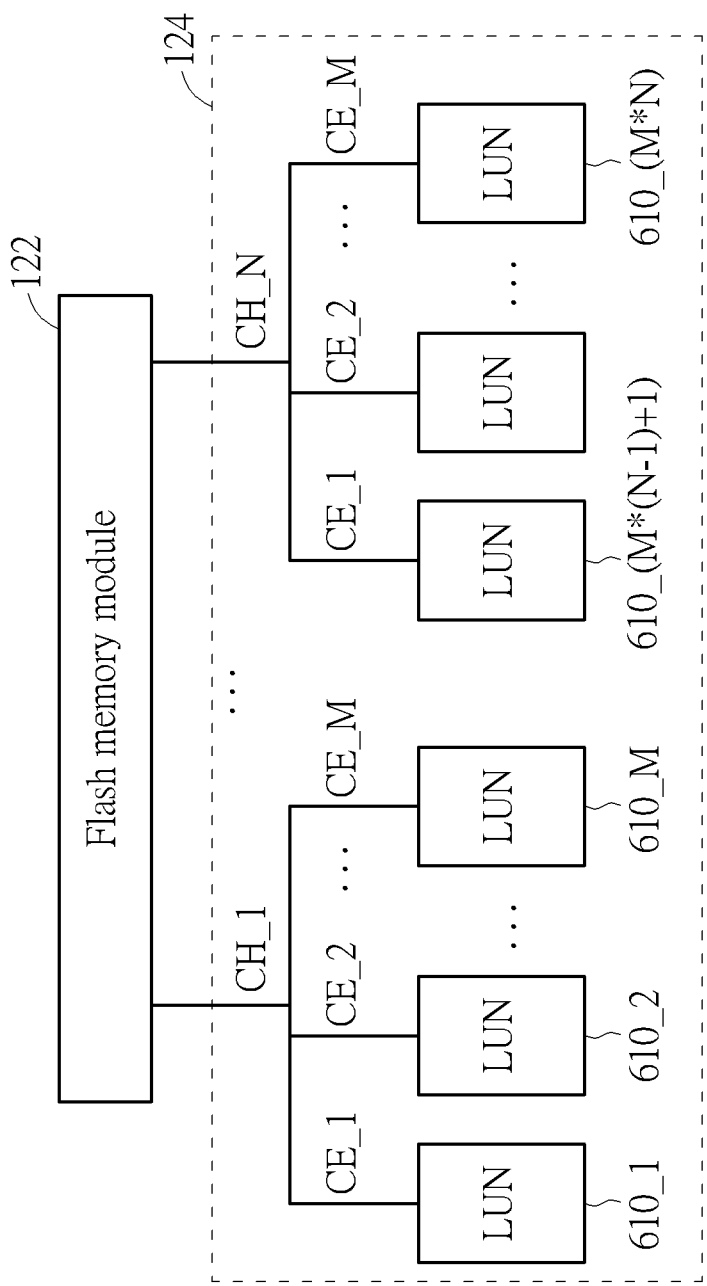
FIG. 6 is a configuration of the storage device according to one embodiment of the present invention.

The size of each zone can be determined according to the host device 110, and the host device 110 may refer to a configuration of the storage device 120_1 to determine the zone size. FIG. 6 is a configuration of the storage device 120_1 according to one embodiment of the present invention. As shown in FIG. 6, the flash memory controller 122 is configured to access the flash memory module 124 via a plurality of channels CH_1-CH_N, and each of the channels CH_1-CH_N correspond to a plurality of logical units (LUN) that are enabled by using chip enable signals CE_1-CE_M. For example, the channel CH_1 corresponds to the LUNs 610_1-610_M that are enabled by using the chip enable signals CE_1-CE_M, and the channel CH_N corresponds to the LUNs 610 (M*(N−1)+1)-610_(M*N) that are enabled by using the chip enable signals CE_1-CE_M. In this embodiment, the channels CH_1-CH_N can be processed in parallel to access one of the corresponding LUNs simultaneously. For example, when the chip enable signal CE_1 is enabled and the other chip enable signals are disabled, the first LUN of each channel is allowed to be accessed by the host device 110; and when the chip enable signal CE_2 is enabled and the other chip enable signals are disabled, the second LUN of each channel is allowed to be accessed by the host device 110, and so on. In addition, each one of the LUNs can be a die within the flash memory module 124, or a die may comprise two or more LUNs.

In one embodiment, quantity of the channels and quantity of the chip enable signals can be determined according to designer's consideration, for example, the storage device 120_1 may have sixteen channels and four chip enable signals (i.e., N is equal to "16", and M is equal to "4").

Figure 7:
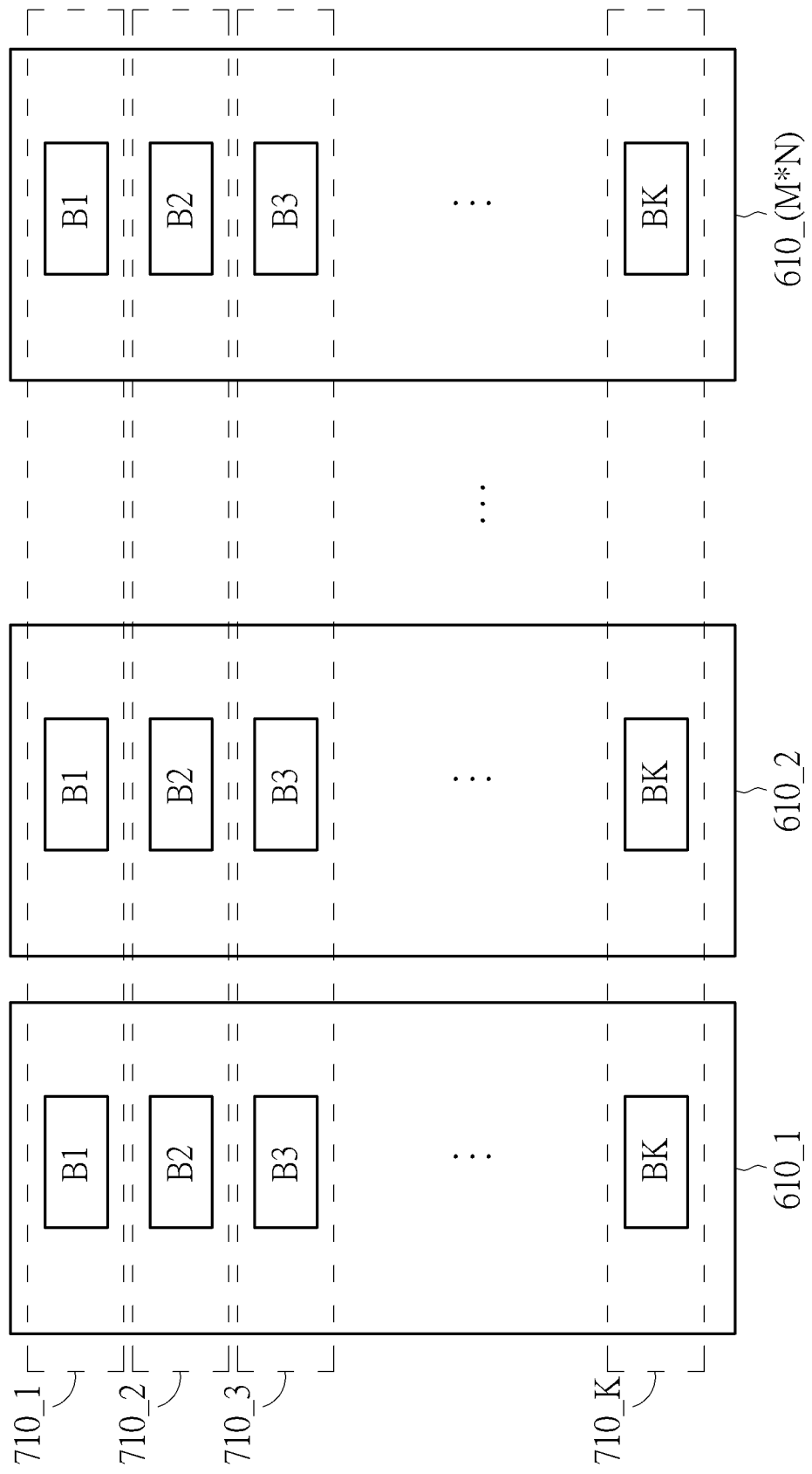
FIG. 7 is a diagram illustrating a super block configuration of the flash memory module according to one embodiment of the present invention.

FIG. 7 is a diagram illustrating a super block configuration of the flash memory module 124 according to one embodiment of the present invention. As shown in FIG. 7, each of the LUNs 610_1-610_(M*N) comprise a plurality of blocks B1-BK. In the process of the super block configuration, the flash memory controller 122 configures blocks B1 of all LUNs 610_1-610_(M*N) as a super block 710_1, configures blocks B2 of all LUNs 610_1-610_(M*N) as a super block 710_2, configures blocks B3 of all LUNs 610_1-610_(M*N) as a super block 710_3, . . . , and configures blocks BK of all LUNs 610_1-610_(M*N) as a super block 710_K. The super block is a logical collection block set by the flash memory controller 122 to facilitate management of the storage device 120_1, and is not a physical collection block. In FIG. 7, the super block 710_1 comprises M*N blocks, and the flash memory controller 122 treats the super block 710_1 as a normal block when accessing the super block 710_1. For example, the super block 710_1 itself is an erasing unit, that is, although the M*N blocks B1 of the super block 710_1 can be erased separately, the flash memory controller 122 must erase the M*N blocks B1 together. In this embodiment, the host device 110 can determine the zone whose size is equal to the size of one superblock.

Figure 8:
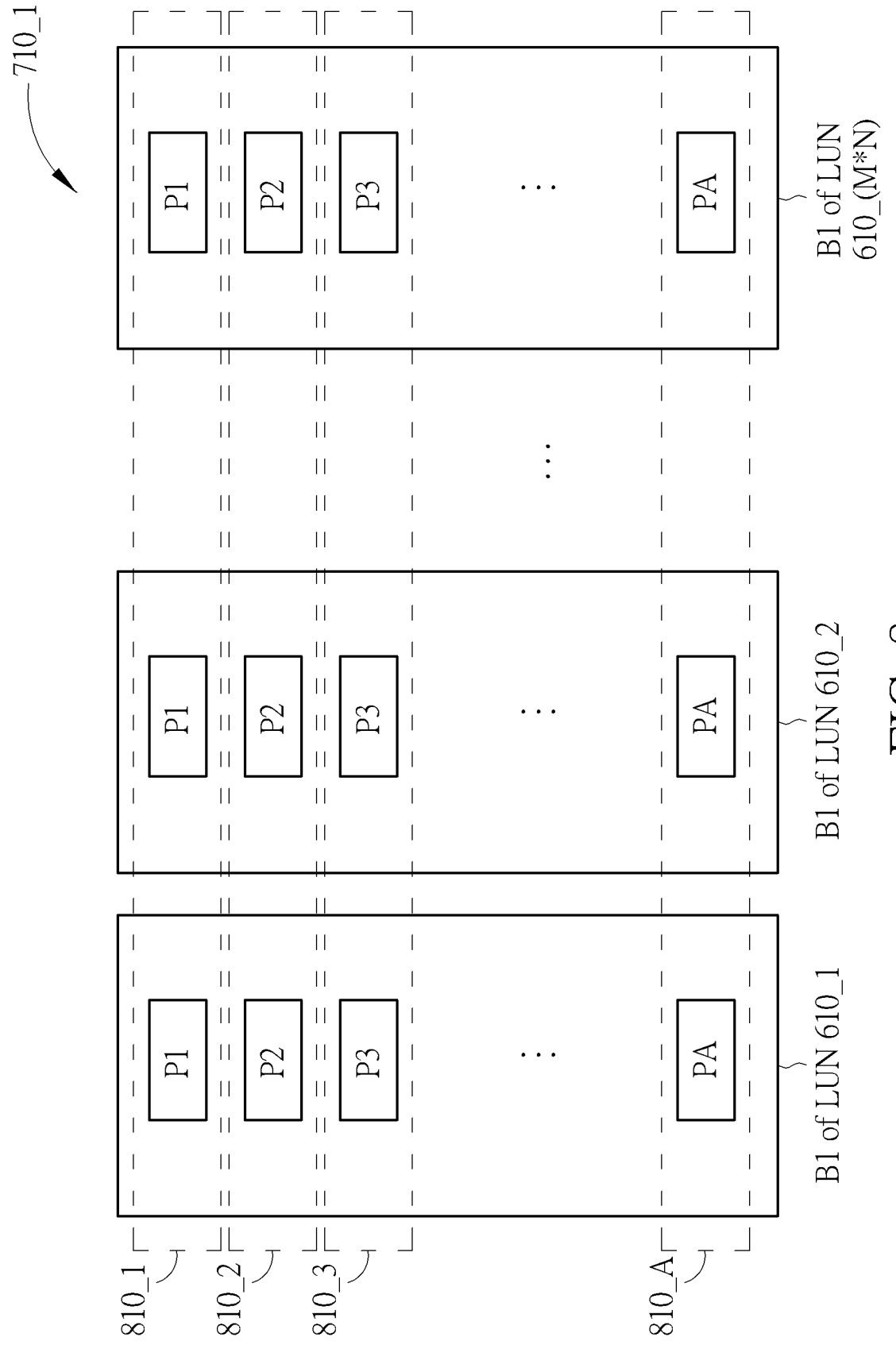
FIG. 8 is a diagram illustrating a super page configuration of the flash memory module according to one embodiment of the present invention.

FIG. 8 is a diagram illustrating a super page configuration of the flash memory module 124 according to one embodiment of the present invention. Taking the super block 710_1 as an example, each of the blocks B1 comprises a plurality of pages P1-PA. In the process of the super page configuration, the flash memory controller 122 configures pages P1 of blocks B1 of all LUNs 610_1-610_(M*N) as a super page 810_1, configures pages P2 of blocks B1 of all LUNs 610_1-610_(M*N) as a super page 810_2, configures pages P3 of blocks B1 of all LUNs 610_1-610_(M*N) as a super page 810_1, . . . , and configures pages PA of blocks B1 of all LUNs 610_1-610_(M*N) as a super page 810_A. In addition, regarding the data writing of the super block 710_1, the super pages 810_1-810_A are written by the flash memory controller 122 sequentially, in other words, the flash memory controller 122 does not start data writing of the super page 810_2 until data writing of the super page 810_1 is completed.

Figure 9:
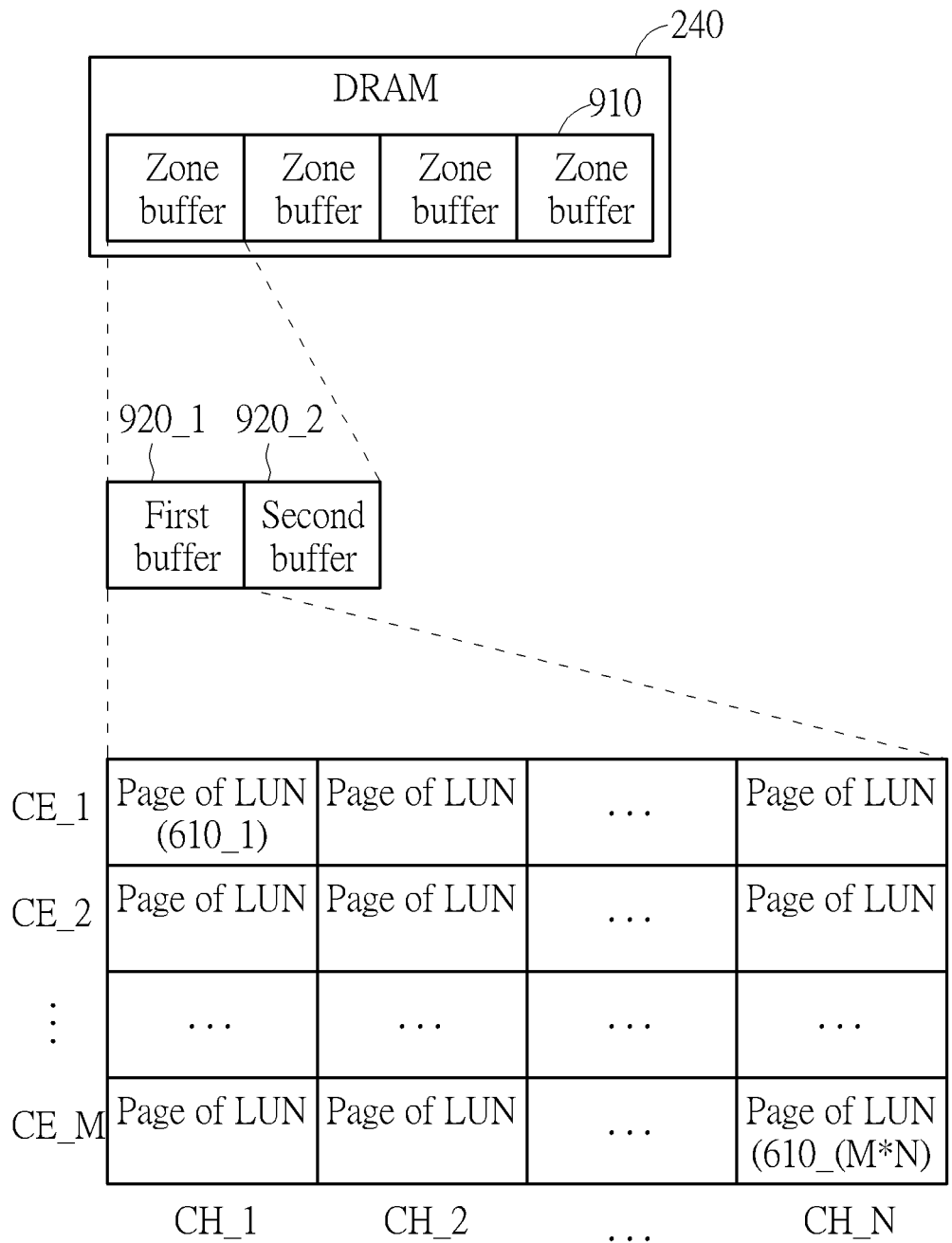
FIG. 9 is a diagram illustrating a data writing operation of the storage device according to one embodiment of the present invention.

FIG. 9 is a diagram illustrating a data writing operation of the storage device 120_1 according to one embodiment of the present invention. As shown in FIG. 9, the flash memory controller 122 allocates a memory space 910 within the DRAM 240 for temporarily storing data from the host device 110, and the data storing in the memory space 910 is then written into the flash memory module 124. Specifically, the flash memory controller 122 divides the memory space 910 into several zone buffers, wherein each of the zone buffers is used to store data corresponding to one zone having the opened state. For example, if the host device 110 notifies the flash memory controller 122 that two zones Z1 and Z2 have the opened state, the microprocessor 212 within the flash memory controller 122 can assign a first zone buffer within the memory space 910 to be exclusively used to store data of the zone Z1, and the microprocessor 212 can assign a second zone buffer within the memory space 910 to be exclusively used to store data of the zone Z2. In addition, each of the zone buffers comprises a first buffer 920_1 and a second buffer 920_2, wherein a size of each of the first buffer 920_1 and the second buffer 920_2 is equal to a size of the super page shown in FIG. 8. For example, assuming that the storage device 120_1 has sixteen channels and four chip enable signals (i.e., N is equal to "16", and M is equal to "4"), and each page has a size equal to 16-kilobytes, the size of each of the first buffer 920_1 and the second buffer 920_2 is equal to 1024-kilobytes. When the host device 110 writes data of the zone Z1 into the storage device 120_1, initially the first buffer 920_1 is used to temporarily store the data from the host device 110. After the first buffer 920_1 is filled with data, the microprocessor 212 starts to move the data of the first buffer 920_1 to the super are sequentially enabled (only one chip enable signal has the enabling state at the same time), and the data of the first buffer 920_1 are sequentially moved to the corresponding pages of the super super page 810_1, meanwhile, the second buffer 920_2 is used to temporarily store the data from the host device 110. After the second buffer 920_2 is filled with data and the all of the data within the first buffer 920_1 has been moved to the super page 810_1, the microprocessor 212 starts to move the data of the second buffer 920_2 to the super page 810_2. When the data of the second buffer 920_2 is moving to the super page 810_2, meanwhile, the first buffer 920_1 is used to temporarily store the data from the host device 110. Then, after the first buffer 920_1 is filled with data and the all of the data within the second buffer 920_2 has been moved to the super page 810_2, the microprocessor 212 starts to move the data of the first buffer 920_1 to the super page 810_3, and so on.

In light of above, by using the first buffer 920_1 and the second buffer 920_2 to alternately store data from the host device 110 and write data to the flash memory module 124, the flash memory controller 122 can write data into the flash memory module 124 with better efficiency.

Figure 10:
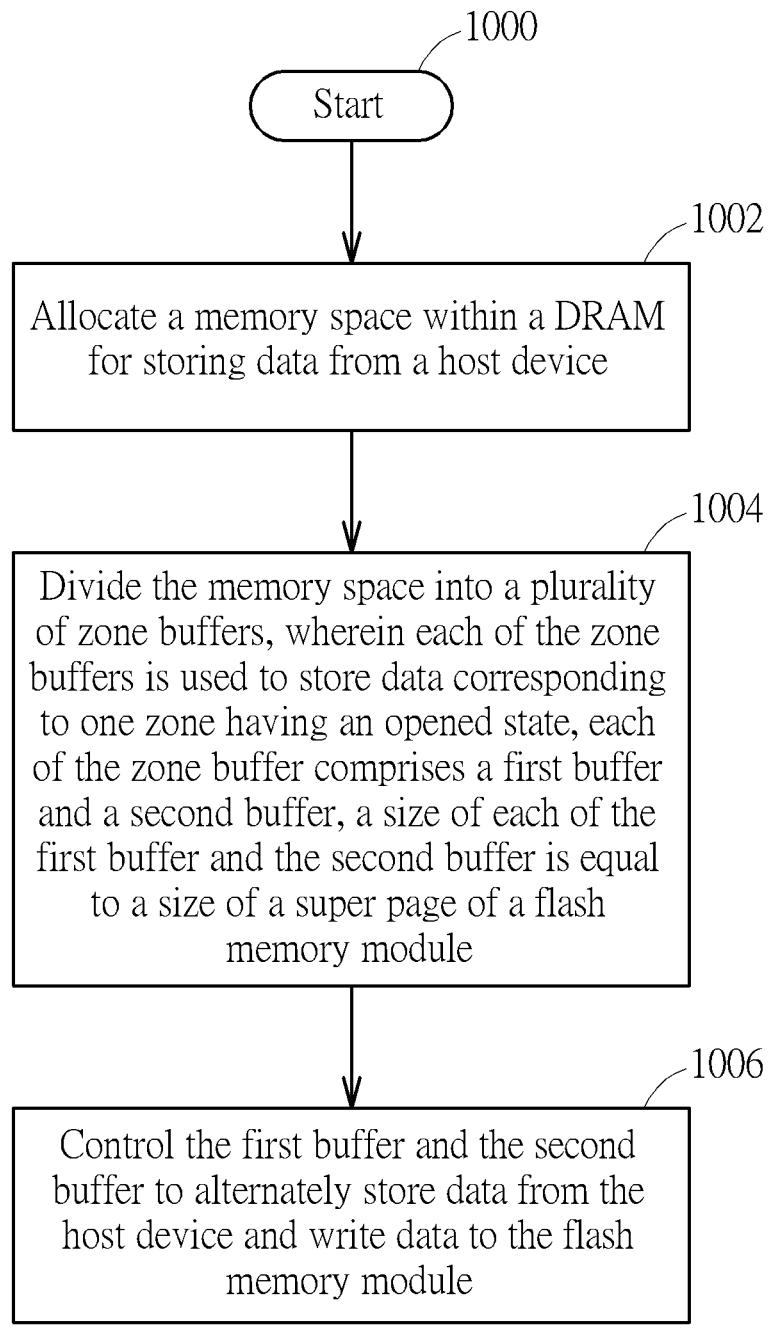
FIG. 10 is a flowchart of a control method of the flash memory controller according to one embodiment of the present invention.

FIG. 10 is a flowchart of a control method of the flash memory controller 122 according to one embodiment of the present invention. Referring to the above embodiments shown in FIGS. 6-9 together, the control method is described as follows.

Step 1000: the flow starts.

Step 1002: allocate a memory space within a DRAM for storing data from a host device.

Step 1004: divide the memory space into a plurality of zone buffers, wherein each of the zone buffers is used to store data corresponding to one zone having an opened state, each of the zone buffer comprises a first buffer and a second buffer, a size of each of the first buffer and the second buffer is equal to a size of a super page of a flash memory module.

Step 1006: control the first buffer and the second buffer to alternately store data from the host device and write data to the flash memory module.

Figure 11:
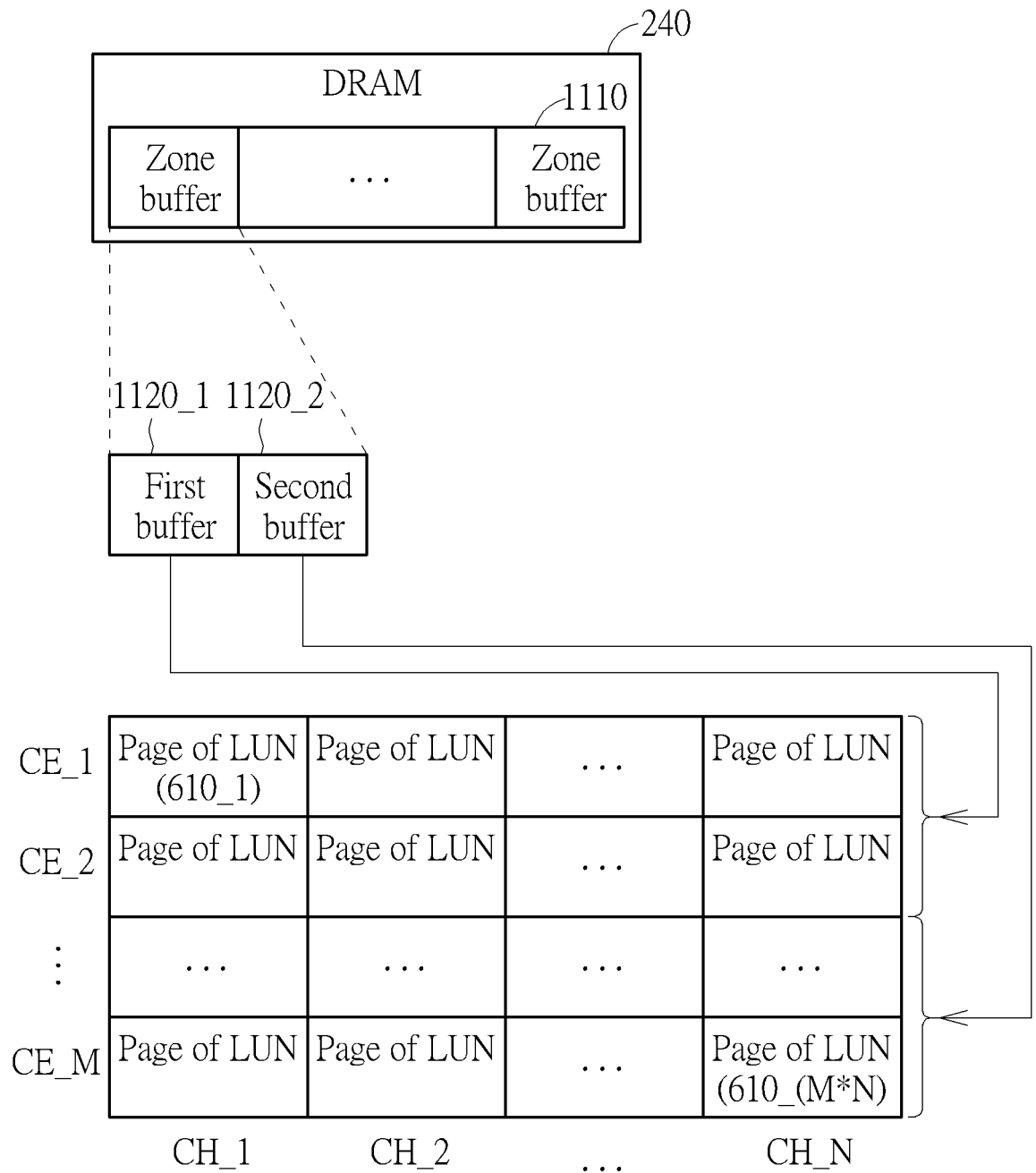
FIG. 11 is a diagram illustrating a data writing operation of the storage device according to one embodiment of the present invention.

In the embodiment shown in FIG. 9 and FIG. 10, because each zone buffer dedicated for one zone has a size equal to two super pages, due to the limited capacity of the DRAM 240, the flash memory controller can only store data corresponding to fewer zones, that is, the host device 110 cannot open too many zones. In order to solve this problem, another embodiment shown in FIG. 11 is provided to reduce the size of the zone buffer and allow the host device 110 to open more zones. As shown in FIG. 11, the flash memory controller 122 allocates a memory space 1110 within the DRAM 240 for temporarily storing data from the host device 110, and the data storing in the memory space 1110 is then written into the flash memory module 124. Specifically, the flash memory controller 122 divides the memory space 1110 into several zone buffers, wherein each of the zone buffers is used to store data corresponding to one zone having the opened state. For example, if the host device 110 notifies the flash memory controller 122 that three zones Z1, 22 and Z3 have the opened state, the microprocessor 212 within the flash memory controller 122 can assign a first zone buffer within the memory space 1110 to be exclusively used to store data of the zone Z1, the microprocessor 212 can assign a second zone buffer within the memory space 1110 to be exclusively used to store data of the zone Z2, and the microprocessor 212 can assign a third zone buffer within the memory space 1110 to be exclusively used to store data of the zone Z3. In addition, each of the zone buffers comprises a first buffer 1120_1 and a second buffer 1120_2, wherein a size of each of the first buffer 1120_1 and the second buffer 1120_2 is half the size of the super page shown in FIG. 8. For example, assuming that the storage device 120_1 has sixteen channels and four chip enable signals (i.e., Nis equal to "16", and M is equal to "4"), and each page has a size equal to 16-kilobytes, the size of each of the first buffer 1120_1 and the second buffer 1120_2 is equal to 512-kilobytes. When the host device 110 writes data of the zone Z1 into the storage device 120_1, initially the first buffer 1120_1 is used to temporarily store the data from the host device 110. After the first buffer 1120_1 is filled with data, the microprocessor 212 starts to move the data of the first buffer 920_1 to the super page 810_1. As shown in FIG. 9, the chip enable signals CE_1-CE (M/2) are sequentially enabled (only one chip enable signal has the enabling state at the same time), and the data of the first buffer 1120_1 are sequentially moved to the corresponding pages of the super page 810_1. When the data of the first buffer 1120_1 is moving to the super page 810_1, meanwhile, the second buffer 1120_2 is used to temporarily store the data from the host device 110. After the second buffer 1120_2 is filled with data and the all of the data within the first buffer 1120_1 has been moved to the super page 810_1, the microprocessor 212 starts to move the data of the second buffer 1120_2 to the super page 810_1. Specifically, the chip enable signals CE (M/2+1)-CE_M are sequentially enabled (only one chip enable signal has the enabling state at the same time), and the data of the second buffer 1120_2 are sequentially moved to the corresponding pages of the super page 810_1. When the data of the second buffer 1120_2 is moving to the super page 810_1, meanwhile, the first buffer 1120_1 is used to temporarily store the data from the host device 110. Then, after the first buffer 1120_1 is filled with data and the all of the data within the second buffer 1120_2 has been moved to the super page 810_1, the microprocessor 212 starts to move the data of the first buffer 1120_1 to the super page 810_2, as so on.

In light of above, by using the first buffer 1120_1 and the second buffer 1120_2 to alternately store data from the host device 110 and write data to the flash memory module 124, the flash memory controller 122 can write data into the flash memory module 124 with better efficiency. In addition, because each of the first buffer 1120_1 and the second buffer 1120_2 has only half the size of one super page, the memory space 1110 can be divided to have more zone buffers, and the host device 110 can open more zones for data writing.

In another embodiment, each of the first buffer 1120_1 and the second buffer 1120_2 can be configured to have a size equal to pages corresponding to one or more chip enable signals. For example, the size of the first buffer 1120_1 is equal to all the pages of the blocks of the LUNs corresponding to one chip enable signal such as CE_1, that is the size of the first buffer 1120_1 is equal to N*page size; or the size of the first buffer 1120_1 is equal to all the pages of the blocks of the LUNs corresponding to two chip enable signal such as CE_1 and CE_2, that is the size of the first buffer 1120_1 is equal to 2*N*page size. These alternative designs shall fall within the scope of the present invention.

Figure 12:
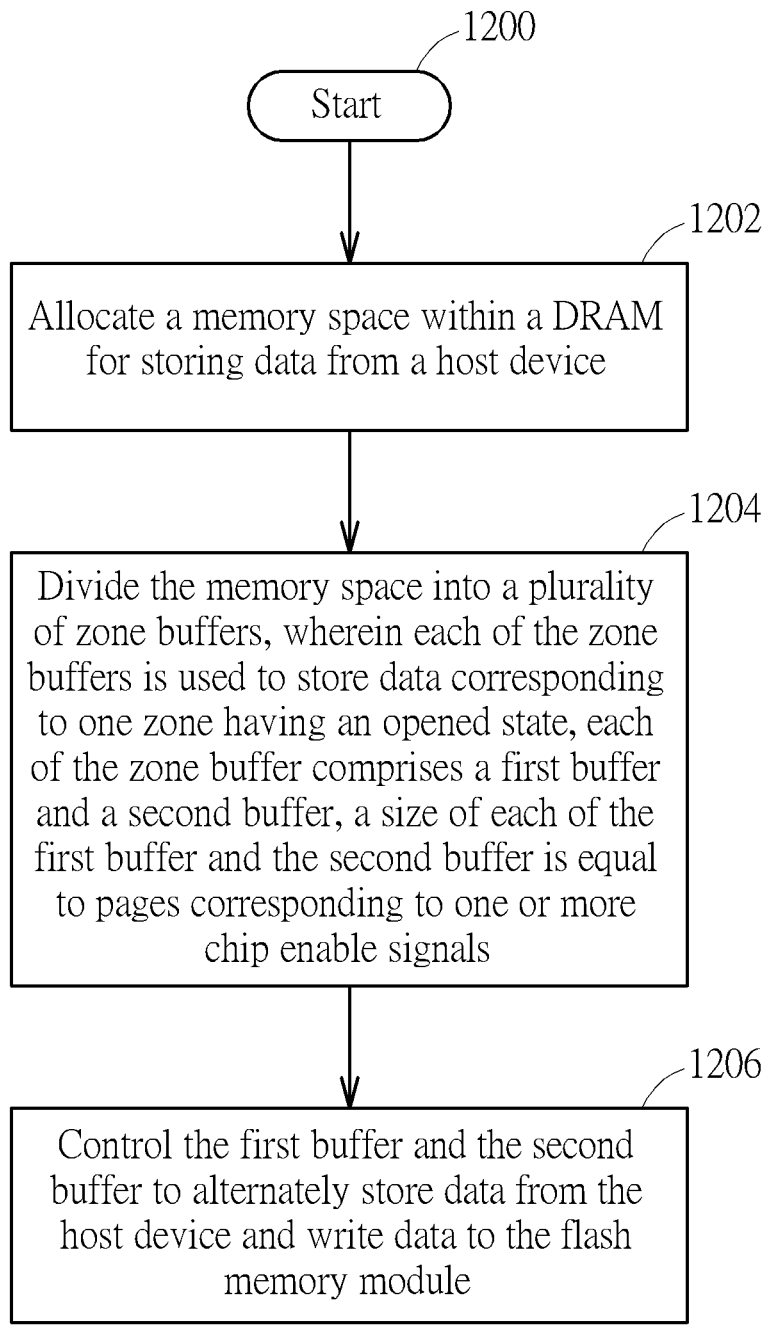
FIG. 12 is a flowchart of a control method of the flash memory controller according to one embodiment of the present invention.

FIG. 12 is a flowchart of a control method of the flash memory controller 122 according to one embodiment of the present invention. Referring to the above embodiments shown in FIGS. 6-8 and FIG. 10 together, the control method is described as follows.

Step 1200: the flow starts.

Step 1202: allocate a memory space within a DRAM for storing data from a host device.

Step 1204: divide the memory space into a plurality of zone buffers, wherein each of the zone buffers is used to store data corresponding to one zone having an opened state, each of the zone buffer comprises a first buffer and a second buffer, a size of each of the first buffer and the second buffer is equal to pages corresponding to one or more chip enable signals.

Step 1206: control the first buffer and the second buffer to alternately store data from the host device and write data to the flash memory module.

Figure 13:
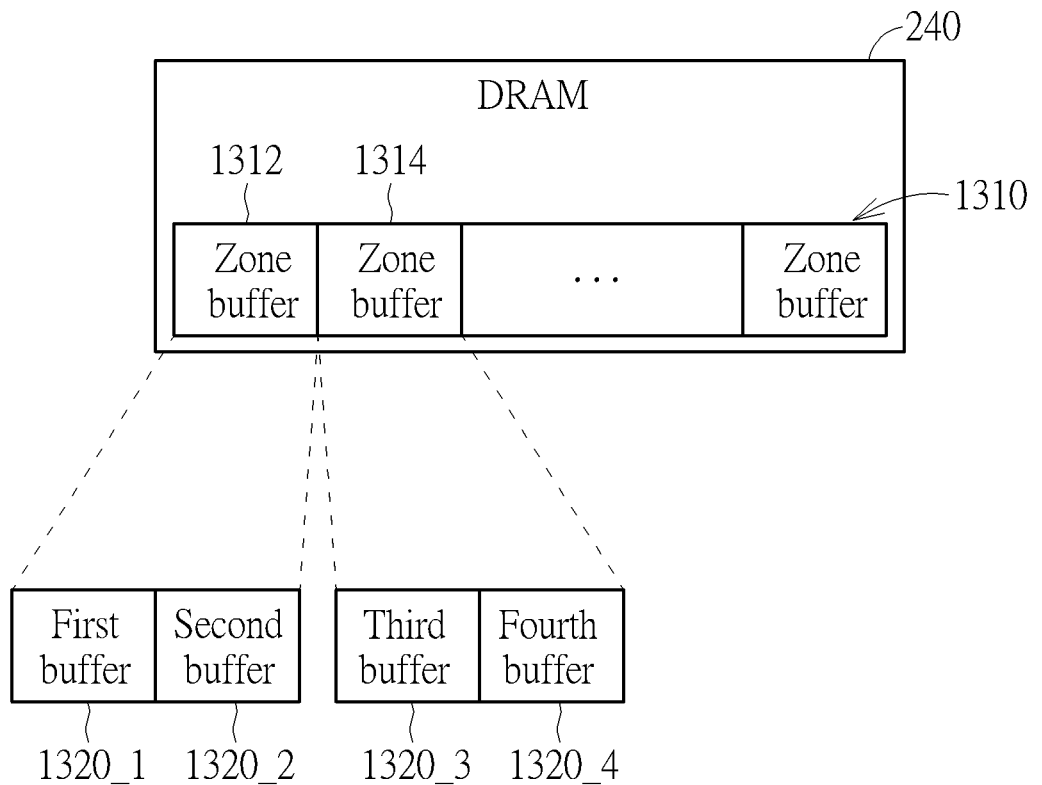
FIG. 13 is a diagram illustrating a data writing operation of the storage device according to one embodiment of the present invention.

The embodiments shown in FIG. 11 and FIG. 12 can increase the number of zones having opened state. However, because a speed at which the host device 110 writes data to the DRAM 240 is faster than a speed at which the flash memory controller 122 moves data from the DRAM 240 to the flash memory module 124, designing the first buffer 1120_1 and the second buffer 1120_2 with smaller sizes sometimes result in lower write efficiency for the host device 110. In order to solve this problem, another embodiment shown in FIG. 13 is provided to dynamically allocate the zone buffer for different zones to enhance the efficiency of the electronic device 100. As shown in FIG. 13, As shown in FIG. 13, the flash memory controller 122 allocates a memory space 1310 within the DRAM 240 for temporarily storing data from the host device 110, and the data storing in the memory space 1310 is then written into the flash memory module 124. Specifically, the flash memory controller 122 divides the memory space 1310 into several zone buffers such as 1312 and 1314, wherein each of the zone buffers is used to store data corresponding to one zone having an opened state. In addition, each of the zone buffers comprises two buffers, for example, the zone buffer 1312 comprise a first buffer 1320_1 and a second buffer 1320_2, the zone buffer 1314 comprise a third buffer 1320_3 and a fourth buffer 1320_4, wherein a size of each of the first buffer 1320_1 and the second buffer 1320_2, the third buffer 1320_3 and the fourth buffer 1320_4 is half the size of the super page shown in FIG. 8. For example, assuming that the storage device 120_1 has sixteen channels and four chip enable signals (i.e., N is equal to "16", and M is equal to "4"), and each page has a size equal to 16-kilobytes, the size of each of the first buffer 1320_1 and the second buffer 1320_2, the third buffer 1320_3 and the fourth buffer 1320_4 is equal to 512-kilobytes.

In the operation of the embodiment shown in FIG. 13, initially if the host device 110 notifies the flash memory controller 122 that many zones comprising zones Z1 and Z2 have the opened state, the microprocessor 212 can assign the zone buffer 1312 for storing the data of the zone Z1, and assign the zone buffer 1314 for storing the data of the zone Z1. At this time, the operations of the first buffer 1320_1 and the second buffer 1320_2 are the same as the first buffer 1120_1 and the second buffer 1120_2 shown in FIG. 11, that is, the first buffer 1120_1 and the second buffer 1120_2 are configured to alternately store data (half of the super page) from the host device 110 and write data (half of the super page) to the super block corresponding to the zone Z1; and the operations of the third buffer 1320_3 and the fourth buffer 1320_4 are also the same as the first buffer 1120_1 and the second buffer 1120_2 shown in FIG. 11, that is, the third buffer 1320_3 and the fourth buffer 1320_4 are configured to alternately store data (half of the super page) from the host device 110 and write data (half of the super page) to the super block corresponding to the zone Z2. In this embodiment, although the zone Z1/Z2 has the opened stage, the host device 110 may not always write data of the zone Z1/Z2 into the DRAM 240, but may write data of the zone Z1/Z2 intermittently. Therefore, to use the memory space 1310 more efficiently, the microprocessor 212 will detect how long the host device 110 has not written data of the zones Z1 and 22 to generate a determination result, and if the determination result indicates that an idle time of the zone Z1 or Z2, or an idle time of the zone buffer 1312 or 1314 (i.e., length of time the host device 110 has not provided data for the zone Z1 or Z2) is greater than a threshold value, its zone buffer can be temporarily assigned to another zone.

Specifically, if the microprocessor 212 detects that the idle time of the zone Z2 is greater than the threshold value, the microprocessor 212 can reallocate the zones Z1 and Z2 so that both the zone buffers 1312 and 1314 are used to store the data of zone Z1. At this time, the first buffer 1320_1 and the second buffer 1320_1 included in the zone buffer 1312 serve as the first buffer 920_1 shown in FIG. 9, and the third buffer 1320_3 and the fourth buffer 1320_4 included in the zone buffer 1314 serve as the second buffer 920_2 shown in FIG. 9, that is, the zone buffers 1312 and 1314 are configured to alternately store data (with the size of the super page) from the host device 110 and write data (with the size of the super page) to the super block corresponding to the zone Z1. It is noted that, at this time, the zone Z2 still has the opened state, and the flash memory module 124 has not stored all of the data of the zone Z2 (i.e., the host device 110 may write data of the zone Z2 to the DRAM 240 later).

Then, if the host device 110 notifies the flash memory controller 122 that the zone Z2 is to be written, the microprocessor 212 can reallocate the zones Z1 and Z2 to the original states, that is the first buffer 1320_1 and the second buffer 1320_2 of the zone buffer 1312 are configured to alternately store data (half of the super page) from the host device 110 and write data (half of the super page) to the super block corresponding to the zone Z1, and the third buffer 1320_3 and the fourth buffer 1320_4 are configured to alternately store data (half of the super page) from the host device 110 and write data (half of the super page) to the super block corresponding to the zone Z2.

In another embodiment, each of the first buffer 1320_1, the second buffer 1320_2, the third buffer 1320_3 and the fourth buffer 1320_4 can be configured to have a size equal to pages corresponding to one or more chip enable signals. For example, the size of the first buffer 1320_1 is equal to all the pages of the blocks of the LUNs corresponding to one chip enable signal such as CE_1, that is the size of the first buffer 1320_1 is equal to N*page size; or the size of the first buffer 1320_1 is equal to all the pages of the blocks of the LUNs corresponding to two chip enable signal such as CE_1 and CE_2, that is the size of the first buffer 1320_1 is equal to 2*N*page size. These alternative designs shall fall within the scope of the present invention.

Figure 14:
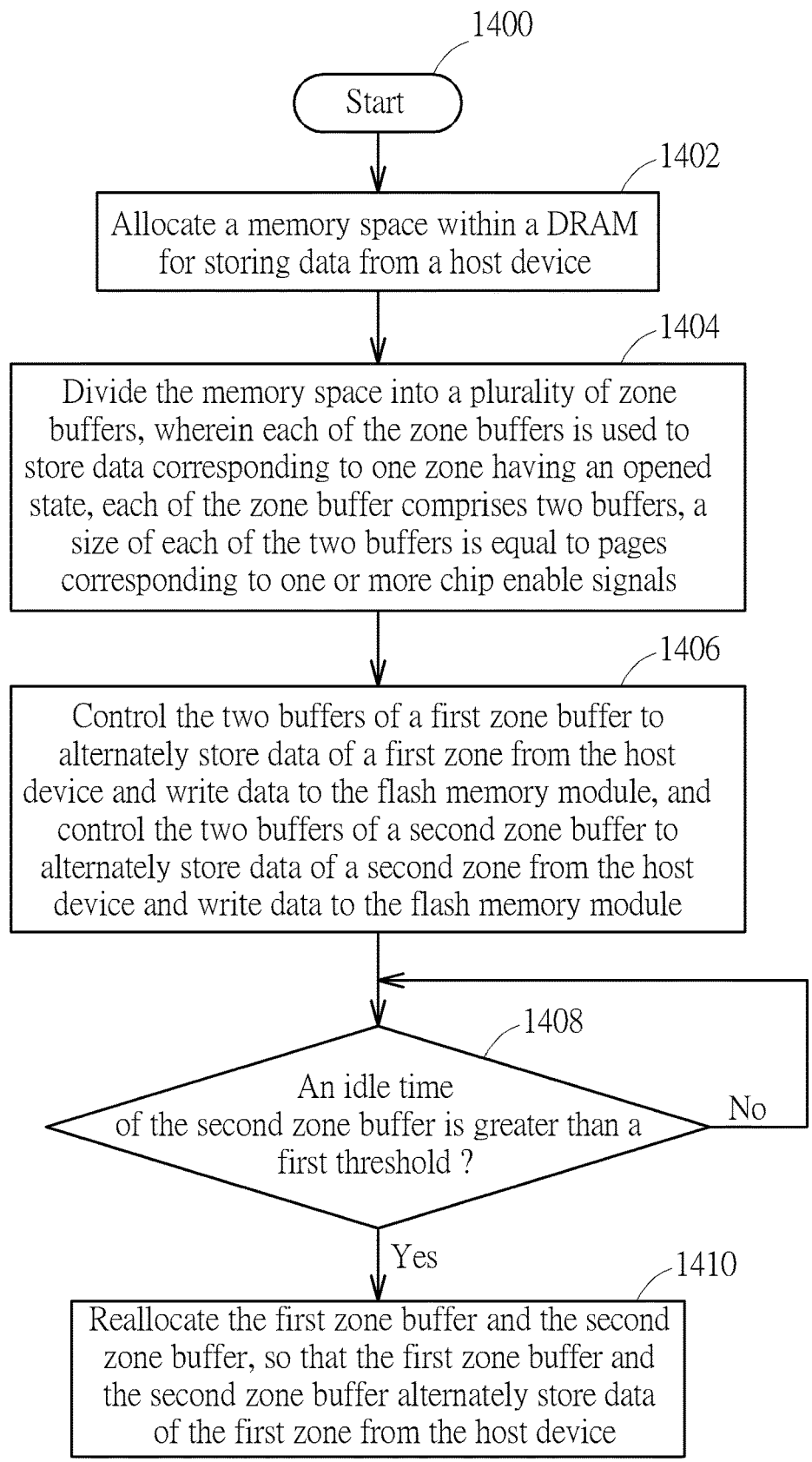
FIG. 14 is a flowchart of a control method of the flash memory controller according to one embodiment of the present invention.

FIG. 14 is a flowchart of a control method of the flash memory controller 122 according to one embodiment of the present invention. Referring to the above embodiments shown in FIGS. 6-13 together, the control method is described as follows.

Step 1400: the flow starts.

Step 1402: allocate a memory space within a DRAM for storing data from a host device.

Step 1404: divide the memory space into a plurality of zone buffers, wherein each of the zone buffers is used to store data corresponding to one zone having an opened state, each of the zone buffer comprises two buffers, a size of each of the two buffers is equal to pages corresponding to one or more chip enable signals.

Step 1406: control the two buffers of a first zone buffer to alternately store data of a first zone from the host device and write data to the flash memory module, and control the two buffers of a second zone buffer to alternately store data of a second zone from the host device and write data to the flash memory module.

Step 1408: determine if an idle time of the second zone buffer is greater than a first threshold, if yes, the flow enters Step 1410; and if not, the flow stays in the Step 1408.

Step 1410: reallocate the first zone buffer and the second zone buffer, so that the first zone buffer and the second zone buffer alternately store data of the first zone from the host device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of a flash memory controller, wherein the flash memory controller is configured to access a flash memory module, the flash memory module comprises a plurality of blocks, and the control method comprising:
   receiving a settling command from a host device, wherein the settling command configures at least one portion of the flash memory module as a zoned namespace, wherein the zoned namespace logically comprises a plurality of zones, the host device performs a zone-based data write operation on the zoned namespace, where a size of each zone of the plurality of zones is of a same size, logical addresses corresponding to each zone are continuous, and the logical addresses are not overlapping between zones;
   allocating a memory space within a memory for storing data from the host device;
   dividing the memory space into a plurality of zone buffers, wherein each of the zone buffers is used to store data corresponding to one zone having an opened state; and
   for a first zone buffer of the plurality of zone buffers, controlling a first buffer and a second buffer within the first zone buffer where the first buffer and the second buffer are configured to respectively alternately store data of a first zone from the host device and write the data of the first zone to the zoned namespace of the flash memory module.

2. The control method of claim 1, further comprising:
   configuring the zoned namespace to have a plurality of super blocks, wherein each of the plurality of super block comprises a plurality of blocks respectively located in different logical units (LUN); and
   for a first super block of the plurality of super blocks, configuring the first super block to have a plurality of super pages, wherein each of the plurality of super pages comprises a plurality of pages respectively located in different blocks of the first super block;
   wherein a size of the first buffer is equal to a size of the second buffer, and the size of the first buffer is determined according to a size of one super page.

3. The control method of claim 2, wherein the flash memory controller is configured to access the flash memory module via a plurality of channels, and each of the plurality of channels correspond to a plurality of LUNs that are enabled by using a plurality of chip enable signals, respectively; and the size of the first buffer is equal to pages corresponding to one or more chip enable signals.

4. The control method of claim 3, wherein the size of the first buffer is equal to the size of one super page.

5. The control method of claim 3, wherein the size of the first buffer is equal to half the size of one super page.

6. The control method of claim 1, further comprising:
   for a second zone buffer of the plurality of zone buffers, controlling a third buffer and a fourth buffer within the second zone buffer to alternately store data of a second zone from the host device and write the data of the second zone to the zoned namespace of the flash memory module;
   determining if an idle time of the second zone or the second zone buffer is greater than a threshold value to generate a determination result;
   in response to the determination result indicating that the idle time of the second zone or the second zone buffer is greater than the threshold value, reallocating the third buffer and the fourth buffer of the second zone buffer to store the data of the first zone from the host device and write the data of the first zone to the zoned namespace of the flash memory module.

7. The control method of claim 6, wherein the step of in response to the determination result indicating that the idle time of the second zone or the second zone buffer is greater than the threshold value, reallocating the third buffer and the fourth buffer of the second zone buffer to store the data of the first zone from the host device and write the data of the first zone to the zoned namespace of the flash memory module comprises:
   in response to the determination result indicating that the idle time of the second zone or the second zone buffer is greater than the threshold value, reallocating the first zone buffer and the second zone buffer to alternately store the data of the first zone from the host device and write the data of the first zone to the zoned namespace of the flash memory module.

8. A flash memory controller, wherein the flash memory controller is configured to access a flash memory module, the flash memory module comprises a plurality of blocks, and the flash memory controller comprising:

a read only memory, configured to store a code;
a microprocessor, configured to execute the code for controlling access of the flash memory module; and
a buffer memory;
wherein the microprocessor is configured to perform the steps of:
receiving a settling command from a host device, wherein the settling command configures at least one portion of the flash memory module as a zoned namespace, wherein the zoned namespace logically comprises a plurality of zones, the host device performs a zone-based data write operation on the zoned namespace, where a size of each zone of the plurality of zones is of a same size, logical addresses corresponding to each zone are continuous, and the logical addresses are not overlapping between zones;
allocating a memory space within a memory for storing data from the host device;
dividing the memory space into a plurality of zone buffers, wherein each of the zone buffers is used to store data corresponding to one zone having an opened state; and
for a first zone buffer of the plurality of zone buffers, controlling a first buffer and a second buffer within the first zone buffer where the first buffer and the second buffer are configured to respectively alternately store data of a first zone from the host device and write the data of the first zone to the zoned namespace of the flash memory module.

9. The flash memory controller of claim 8, further comprising:
configuring the zoned namespace to have a plurality of super blocks, wherein each of the plurality of super block comprises a plurality of blocks respectively located in different logical units (LUN); and
for a first super block of the plurality of super blocks, configuring the first super block to have a plurality of super pages, wherein each of the plurality of super pages comprises a plurality of pages respectively located in different blocks of the first super block;
wherein a size of the first buffer is equal to a size of the second buffer, and the size of the first buffer is determined according to a size of one super page.

10. The flash memory controller of claim 9, wherein the flash memory controller is configured to access the flash memory module via a plurality of channels, and each of the plurality of channels correspond to a plurality of LUNs that are enabled by using a plurality of chip enable signals, respectively; and the size of the first buffer is equal to pages corresponding to one or more chip enable signals.

11. The flash memory controller of claim 10, wherein the size of the first buffer is equal to the size of one super page.

12. The flash memory controller of claim 10, wherein the size of the first buffer is equal to half the size of one super page.

13. The flash memory controller of claim 8, further comprising:
for a second zone buffer of the plurality of zone buffers, controlling a third buffer and a fourth buffer within the second zone buffer to alternately store data of a second zone from the host device and write the data of the second zone to the zoned namespace of the flash memory module;
determining if an idle time of the second zone or the second zone buffer is greater than a threshold value to generate a determination result;
in response to the determination result indicating that the idle time of the second zone or the second zone buffer is greater than the threshold value, reallocating the third buffer and the fourth buffer of the second zone buffer to store the data of the first zone from the host device and write the data of the first zone to the zoned namespace of the flash memory module.

14. The flash memory controller of claim 13, wherein the step of in response to the determination result indicating that the idle time of the second zone or the second zone buffer is greater than the threshold value, reallocating the third buffer and the fourth buffer of the second zone buffer to store the data of the first zone from the host device and write the data of the first zone to the zoned namespace of the flash memory module comprises:
in response to the determination result indicating that the idle time of the second zone or the second zone buffer is greater than the threshold value, reallocating the first zone buffer and the second zone buffer to alternately store the data of the first zone from the host device and write the data of the first zone to the zoned namespace of the flash memory module.

15. A storage device, comprising:
a flash memory module, wherein the flash memory module comprises a plurality of blocks; and
a flash memory controller, configured to access the flash memory module;
wherein the flash memory controller is configured to perform the steps of:
receiving a settling command from a host device, wherein the settling command configures at least one portion of the flash memory module as a zoned namespace, wherein the zoned namespace logically comprises a plurality of zones, the host device performs a zone-based data write operation on the zoned namespace, where a size of each zone of the plurality of zones is of a same size, logical addresses corresponding to each zone are continuous, and the logical addresses are not overlapping between zones;
allocating a memory space within a memory for storing data from the host device;
dividing the memory space into a plurality of zone buffers, wherein each of the zone buffers is used to store data corresponding to one zone having an opened state; and
for a first zone buffer of the plurality of zone buffers, controlling a first buffer and a second buffer within the first zone buffer where the first buffer and the second buffer are configured to respectively alternately store data of a first zone from the host device and write the data of the first zone to the zoned namespace of the flash memory module.

16. The storage device of claim 15, further comprising:
configuring the zoned namespace to have a plurality of super blocks, wherein each of the plurality of super block comprises a plurality of blocks respectively located in different logical units (LUN); and
for a first super block of the plurality of super blocks, configuring the first super block to have a plurality of super pages, wherein each of the plurality of super pages comprises a plurality of pages respectively located in different blocks of the first super block;
wherein a size of the first buffer is equal to a size of the second buffer, and the size of the first buffer is determined according to a size of one super page.

17. The storage device of claim 15, further comprising:
for a second zone buffer of the plurality of zone buffers, controlling a third buffer and a fourth buffer within the second zone buffer to alternately store data of a second zone from the host device and write the data of the second zone to the zoned namespace of the flash memory module;
determining if an idle time of the second zone or the second zone buffer is greater than a threshold value to generate a determination result;
in response to the determination result indicating that the idle time of the second zone or the second zone buffer is greater than the threshold value, reallocating the third buffer and the fourth buffer of the second zone buffer to store the data of the first zone from the host device and write the data of the first zone to the zoned namespace of the flash memory module.

18. The storage device of claim 17, wherein the step of in response to the determination result indicating that the idle time of the second zone or the second zone buffer is greater than the threshold value, reallocating the third buffer and the fourth buffer of the second zone buffer to store the data of the first zone from the host device and write the data of the first zone to the zoned namespace of the flash memory module comprises:
in response to the determination result indicating that the idle time of the second zone or the second zone buffer is greater than the threshold value, reallocating the first zone buffer and the second zone buffer to alternately store the data of the first zone from the host device and write the data of the first zone to the zoned namespace of the flash memory module.

* * * * *